(12) United States Patent
Wakamatsu et al.

(10) Patent No.: US 7,443,338 B2
(45) Date of Patent: Oct. 28, 2008

(54) NAVIGATION APPARATUS

(75) Inventors: Koutaro Wakamatsu, Iwaki (JP); Takayuki Watanabe, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 198 days.

(21) Appl. No.: 11/249,154

(22) Filed: Oct. 11, 2005

(65) Prior Publication Data

US 2006/0082495 A1    Apr. 20, 2006

(30) Foreign Application Priority Data

Oct. 14, 2004    (JP)    ............................. 2004-299489

(51) Int. Cl.
*G01S 5/14*    (2006.01)
(52) U.S. Cl. ................................. 342/357.02
(58) Field of Classification Search ............. 342/357.02
See application file for complete search history.

(56) References Cited

U.S. PATENT DOCUMENTS 5,075,693 A * 12/1991 McMillan et al. ........... 342/457
5,323,163 A * 6/1994 Maki ...................... 342/357.15
5,373,298 A * 12/1994 Karouby ................. 342/357.02
5,483,456 A    1/1996 Kuwahara et al.
6,377,891 B1 * 4/2002 Gilbert ........................ 701/213
2005/0055160 A1* 3/2005 King .......................... 701/213

* cited by examiner

*Primary Examiner*—Gregory C Issing
(74) *Attorney, Agent, or Firm*—Brinks Hofer Gilson & Lione

(57) ABSTRACT

A navigation apparatus includes a GPS receiver, an error-circle-radius calculating subunit, and a vehicle-position calculating unit. The GPS receiver receives radio waves transmitted from a plurality of GPS satellites and produces a GPS position. The error-circle-radius calculating subunit detects elevation angles of the plurality of GPS satellites used for calculating the GPS position and a center-of-gravity position of the plurality of GPS satellites, and determines an error range around the GPS position on the basis of the detected elevation angles and the center-of-gravity position. The vehicle-position calculating unit calculates a current position using the GPS position obtained from the GPS receiver and the error range determined by the error-circle-radius calculating subunit.

14 Claims, 6 Drawing Sheets

NAVIGATION APPARATUS

BACKGROUND

1. Technical Field

The present invention relates to a navigation apparatus that calculates a current position using the positioning information supplied from a GPS receiver.

2. Background Information

In general, a navigation apparatus has a GPS receiver connected thereto, and the position of a vehicle in which the navigation apparatus is installed is calculated on the basis of the positioning information supplied from the GPS receiver. The positioning information supplied from the GPS receiver includes an error depending on the actual location of GPS satellites. A method for calculating the error range using a decreasing rate of geometric accuracy called PDOP or HDOP is known (see, for example, Japanese Unexamined Patent Application Publication No. 6-148307). For example, combining the positioning using a GPS receiver and the positioning by an autonomous navigation sensor including a gyro and a velocity sensor can improve the detection accuracy of the vehicle position. For example, when the positioning result by an autonomous navigation sensor is within the error range, the positioning result by the autonomous navigation sensor is used. When the positioning result by the autonomous navigation sensor is out of the error range, the positioning result by the autonomous navigation sensor is not used and the positioning result using a GPS receiver is used.

However, since the calculation of the error range discussed in Japanese Unexamined Patent Application Publication No. 6-148307 uses the PDOP or the HDOP, it has a problem of low accuracy. The PDOP and the HDOP are calculated on the basis of the spatial distribution of the GPS satellites used for positioning. In addition, the elevation angles of the GPS satellites and the degree of bias of location of the GPS satellites are not reflected in the calculation of the error range using the value of the PDOP or the HDOP. Therefore, the error range varies widely. The case where GPS satellites having small elevation angles are distributed across a predetermined expanse, and the case where GPS satellites having large elevation angles are distributed across the same expanse in the vicinity of the zenith, are the same in the values of the PDOP and the HDOP, but differ widely in the error included in the positioning result and therefore differ also in the error range calculated therefrom.

BRIEF SUMMARY

The present invention is made in consideration of the foregoing considerations. It is an object of the present invention to provide a navigation apparatus capable of improving the accuracy in the determination of an error range.

In one aspect of the present invention, a navigation apparatus includes a GPS receiver, an elevation-angle detecting unit, a center-of-gravity-position detecting unit, an error-range determining unit, and a current-position calculating unit. The GPS receiver receives radio waves transmitted from a plurality of GPS satellites and produces a GPS position. The elevation-angle detecting unit detects elevation angles of the plurality of GPS satellites used for calculation of the GPS position. The center-of-gravity-position detecting unit detects a center-of-gravity position of the plurality of GPS satellites used for calculation of the GPS position. The error-range determining unit determines an error range around the GPS position on the basis of the elevation angles detected by the elevation-angle detecting unit and the center-of-gravity position detected by the center-of-gravity-position detecting unit. The current-position calculating unit calculates a current position using the GPS position supplied from the GPS receiver and the error range determined by the error-range determining unit. Since the error range of the GPS position is determined in consideration of the elevation angle and the spatial bias of the GPS satellites used for positioning, the accuracy in determining the error range can be improved.

In another aspect of the present invention, a navigation apparatus includes a GPS receiver, an elevation-angle detecting unit, an error-range determining unit, and a current-position calculating unit. The GPS receiver receives radio waves transmitted from a plurality of GPS satellites and produces a GPS position. The elevation-angle detecting unit detects elevation angles of the plurality of GPS satellites used for calculation of the GPS position. The error-range determining unit determines an error range around the GPS position on the basis of the elevation angles detected by the elevation-angle detecting unit. The current-position calculating unit calculates a current position using the GPS position supplied from the GPS receiver and the error range determined by the error-range determining unit. Since the error range of the GPS position is determined in consideration of the elevation angle of the GPS satellites used for positioning, the accuracy in determining of the error range can be improved.

In another aspect of the present invention, a navigation apparatus includes a GPS receiver, a center-of-gravity-position detecting unit, an error-range determining unit, and a current-position calculating unit. The GPS receiver receives radio waves transmitted from a plurality of GPS satellites and produces a GPS position. The center-of-gravity-position detecting unit detects a center-of-gravity position of the plurality of GPS satellites used for calculation of the GPS position. The error-range determining unit determines an error range around the GPS position on the basis of the center-of-gravity position detected by the center-of-gravity-position detecting unit. The current-position calculating unit calculates a current position using the GPS position supplied from the GPS receiver and the error range determined by the error-range determining unit. Since the error range of the GPS position is determined in consideration of the spatial bias of the GPS satellites used for positioning, the accuracy in determining the error range can be improved.

Preferably, the navigation apparatus further includes a positioning unit. The positioning unit performs positioning without using the GPS receiver and produces a second position. The current-position calculating unit uses the second position when the second position is within the error range, and uses the GPS position when the second position is out of the error range, to calculate the current position. The positioning unit preferably is an autonomous navigation sensor including a direction sensor and a velocity sensor. Since a plurality of methods for positioning can be combined in consideration of the error range of the positioning using GPS satellites, and an appropriately set error range is used, the accuracy of calculating the current position can be improved.

Preferably, the error-range determining unit determines the error range on the basis of the degree of deviation from the zenith of the center-of-gravity position detected by the center-of-gravity-position detecting unit. Since the degree of bias of location of the GPS satellites with respect to the zenith is reflected in the error range, the accuracy of determining the error range can be further improved.

Preferably, the error-range determining unit determines the error range in proportion to the degree of deviation. In the case where the GPS satellites are disposed evenly around the zenith, the error range can be reduced. Thus, the error range can be determined with accuracy according to actual conditions.

Preferably, the error-range determining unit finds a minimum value out of the elevation angles of the plurality of GPS satellites and determines the error range on the basis of the minimum value. Since the location of the GPS satellite contributing most to the error is reflected in the error range, the accuracy of determining the error range can be further improved.

Preferably, the error-range determining unit determines the error range in inverse proportion to the minimum value. When a GPS satellite having a small elevation angle is used, a large error range can be set. Thus, the error range can be determined with accuracy according to actual conditions.

DETAILED DESCRIPTION OF THE PREFERRED EMBODIMENTS

Figure 1:
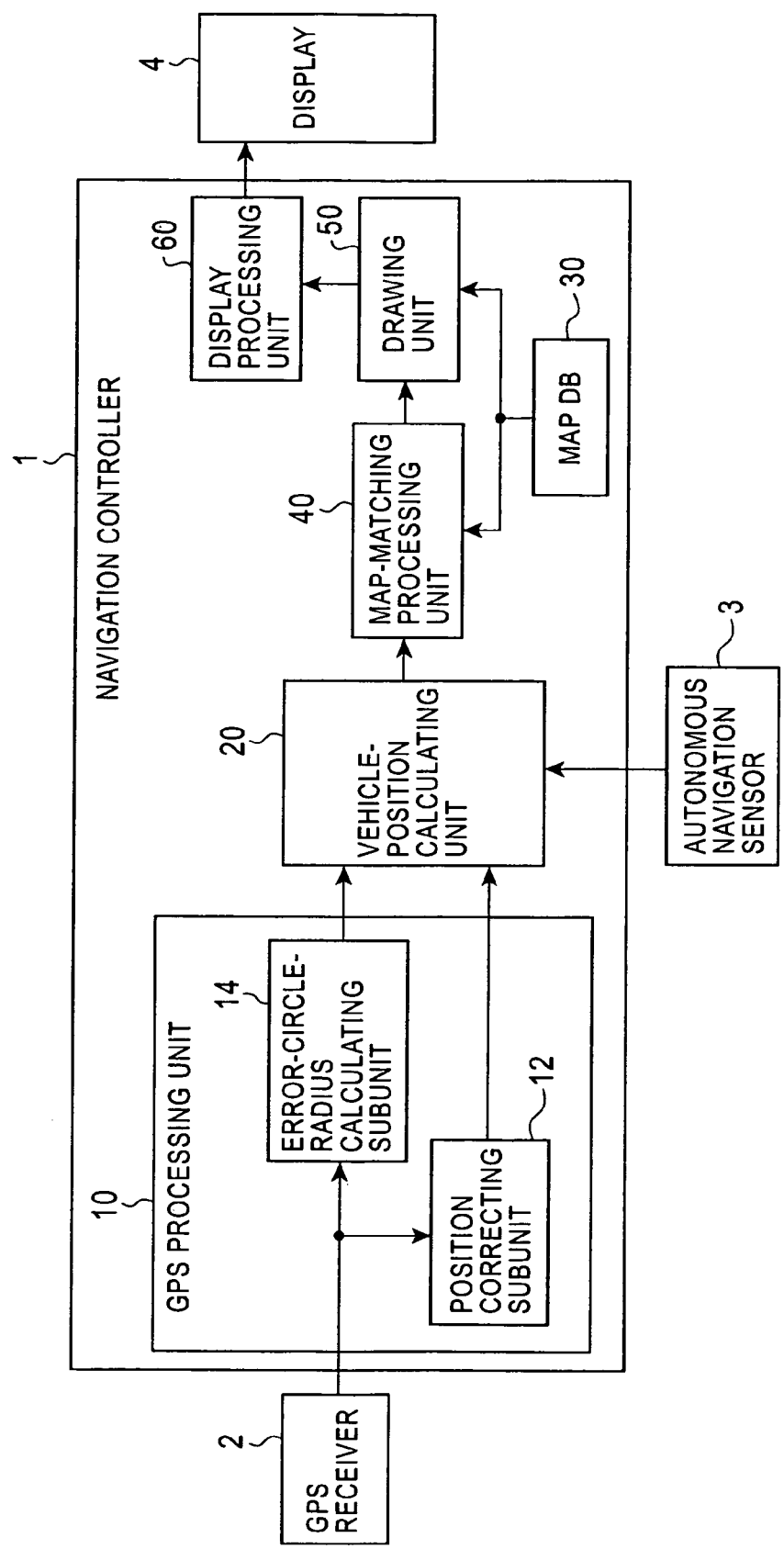
FIG. 1 shows the configuration of a navigation apparatus according to one embodiment.

Embodiments of the present invention will now be described with reference to the drawings. FIG. 1 shows the configuration of a navigation apparatus according to one embodiment. The navigation apparatus includes a navigation controller 1, a GPS receiver 2, an autonomous navigation sensor 3, and a display 4.

The navigation controller 1 controls the entire navigation apparatus. This navigation controller 1 performs its function by executing predetermined operation programs using a CPU, a ROM, a RAM, and so on.

The GPS receiver 2 receives radio waves transmitted from a plurality of GPS satellites, and performs three-dimensional positioning or two-dimensional positioning. The GPS receiver 2 supplies (1) an absolute position (GPS position) of a vehicle, (2) positioning-type information showing whether three-dimensional positioning or two-dimensional positioning is performed, and (3) position information of GPS satellites used for positioning. This position information includes elevation angles and bearings of GPS satellites used for positioning. The autonomous navigation sensor 3 includes an angle sensor (e.g., a gyro) and a distance sensor. The angle sensor detects a rotation angle of the vehicle as a relative bearing. The distance sensor produces a pulse at every predetermined distance. The autonomous navigation sensor 3 detects a relative position and bearing of the vehicle. The display 4 displays various images (e.g., a map image around the position of the vehicle) on the basis of drawing data supplied from the navigation controller 1.

As shown in FIG. 1, the navigation controller 1 includes a GPS processing unit 10, a vehicle-position calculating unit 20, a map DB (database) 30, a map-matching processing unit 40, a drawing unit 50, and a display processing unit 60. The GPS position, the position information of the GPS satellites, and the positioning-type information supplied from the GPS receiver 2 are provided to the GPS processing unit 10. On the basis of this information, the GPS processing unit 10 corrects the GPS position and determines an error circle.

The GPS processing unit 10 includes a position correcting subunit 12 and an error-circle-radius calculating subunit 14. The position correcting subunit 12 performs a predetermined filtering processing of the GPS position supplied from the GPS receiver 2, thereby reducing the influence of the multipath and so on and correcting the GPS position. The error-circle-radius calculating subunit 14 calculates the radius of an error circle in consideration of the error of the GPS position supplied from the GPS receiver 2. The error circle is a circle whose center is the GPS position and in which the correct vehicle position is included. In this calculation, the radius of the error circle is determined on the basis of the elevation angles of the GPS satellites used for positioning, the length of the vector showing the center-of-gravity position of the GPS satellites, and the positioning type (whether three-dimensional positioning or two-dimensional positioning is performed).

The vehicle-position calculating unit 20 determines the vehicle position on the basis of the corrected GPS position supplied from the position correcting subunit 12 in the GPS processing unit 10, and on the basis of a vehicle position obtained from the relative position and bearing supplied from the autonomous navigation sensor 3, in consideration of the error circle radius calculated by the error-circle-radius calculating subunit 14. When a vehicle position calculated on the basis of the output of the autonomous navigation sensor 3 is included in the error circle around the GPS position, the vehicle position is used. When the vehicle position is not included in the error circle, the GPS position supplied from the GPS processing unit 10 is used instead of the vehicle position.

The map DB 30 stores map data including detailed data of links and nodes representing roads, image data necessary for displaying maps, and data necessary for navigating operations such as route searching and driving guidance. The map-matching processing unit 40 performs map-matching processing, i.e., comparing the driving locus with the road shape on the map and thereby correcting the vehicle position supplied from the vehicle-position calculating unit 20. Through the map-matching processing, the position in the width direction of the road is corrected accurately. The drawing unit 50 draws a map image around the corrected vehicle position supplied from the map-matching processing unit 40. This drawing data is sent to the display processing unit 60 and converted into a signal in a form suitable for display. In this way, the map image around the vehicle position is displayed on the display 4.

The error-circle-radius calculating subunit 14 corresponds to the elevation-angle detecting unit, the center-of-gravity-position detecting unit, and the error-range determining unit. The vehicle-position calculating unit 20 corresponds to the current-position calculating unit. The autonomous navigation sensor 3 corresponds to the positioning unit.

The navigation apparatus of the present embodiment has the above configuration. Next, the operation to determine the error circle radius using the error-circle-radius calculating subunit 14 in the GPS processing unit 10 will be described.

In the present embodiment, the error circle radius is determined on the basis of three types of information:
(1) the elevation angles of the GPS satellites used for positioning;
(2) the length of the vector (center-of-gravity vector) showing the center-of-gravity position of the GPS satellites used for positioning; and
(3) the positioning type.

Figure 2:
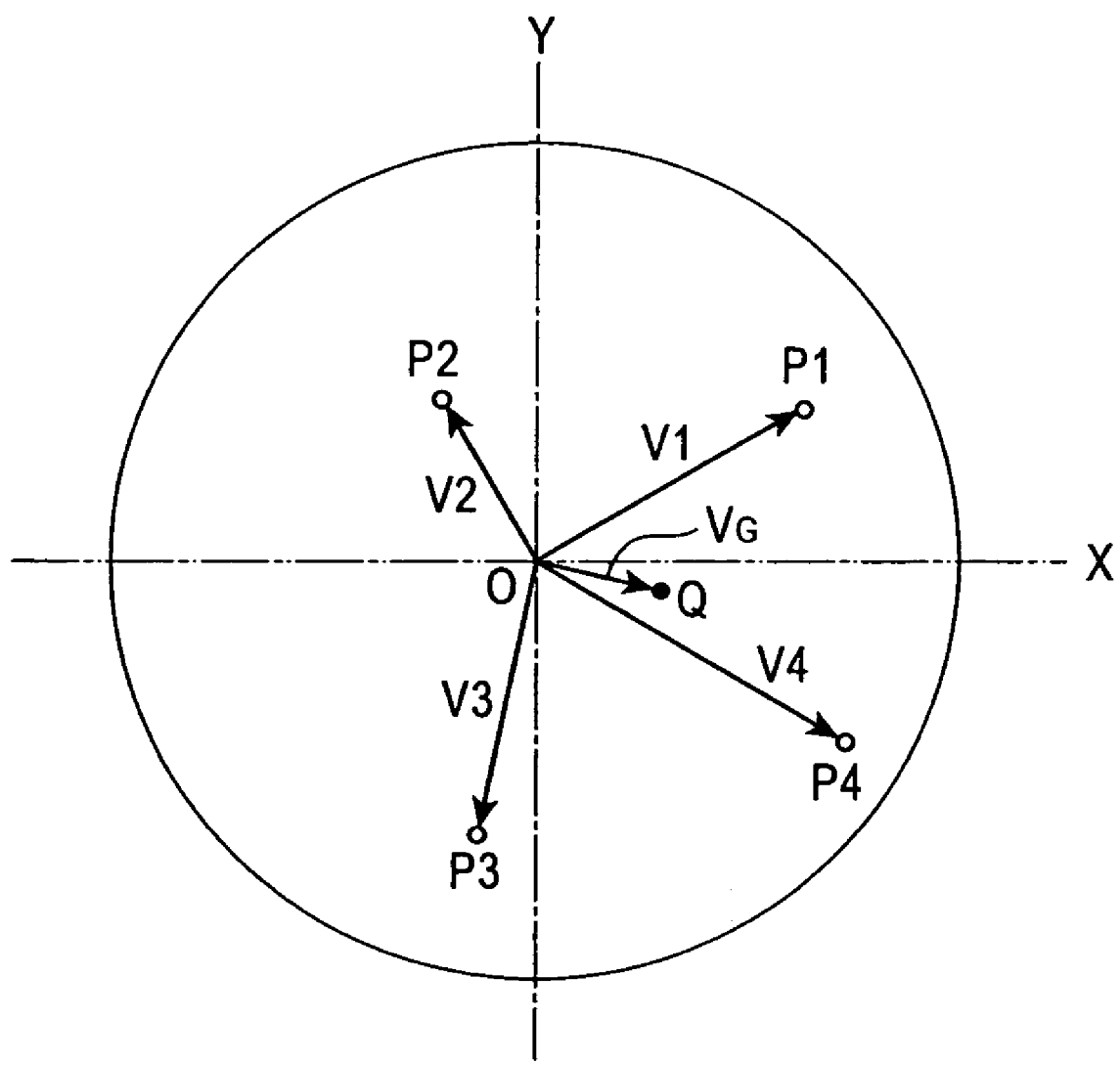
FIG. 2 illustrates the center-of-gravity vector showing the center-of-gravity position.

FIG. 2 illustrates the center-of-gravity vector showing the center-of-gravity position. FIG. 2 shows the plurality of (for example, four) GPS satellites used for positioning, the GPS satellites being projected onto the horizontal plane. The bearing E of each GPS satellite is determined counterclockwise with reference to the X-axis. The circle shown in FIG. 2 shows the projection position when the elevation angle D is zero degrees. Actually, GPS satellites that have elevation angles of more than a predetermined value (for example, five degrees) are used for positioning. Therefore, the actual projection positions are inside the circle. The center of the circle O corresponds to the zenith.

When the vectors from the center of the circle O to the GPS satellites are V1, V2, V3, and V4, the center-of-gravity vector $V_G$ of the four GPS satellites is the resultant vector of the vectors V1, V2, V3, and V4.

When k GPS satellites have elevation angles D1, D2, ..., Dk and bearings E1, E2, ..., Ek, the X-coordinates li, mi, and ni of the i-th GPS satellite are:

$li = \cos(Ei) \times \cos(Di)$ $mi = \cos(Ei) \times \sin(Di)$ $ni = \sin(Ei)$

Therefore, the length of the center-of-gravity vector VG (displacement from the center of the circle O to the center-of-gravity) can be calculated from the following formula:

$$\frac{1}{k}\sqrt{\left(\sum_{n=1}^{k} l_n\right)^2 + \left(\sum_{n=1}^{k} m_n\right)^2}$$

The closer to zero the length of the center-of-gravity vector is, the more evenly the GPS satellites are disposed around the zenith. It can be expected that the closer to zero the length of the center-of-gravity vector is, the smaller the positioning error is. The other determinant factors (the elevation angle and the positioning type) are also closely related to the positioning error. That is to say, when a GPS satellite having a small elevation angle is used for positioning, the positioning error is large, and when a GPS satellite having a large elevation angle is used for positioning, the positioning error is small. In addition, the positioning error in the three-dimensional positioning is smaller than that in the two-dimensional positioning.

As described above, the three determinant factors (the elevation angle, the length of the center-of-gravity vector, and the positioning type) are closely related to the positioning error. However, to determine a specific value of the error circle radius, it is necessary to know the relationship between the three determinant factors and the positioning error. In the present embodiment, the relationship between the three determinant factors and the error circle radius is obtained from experimentation.

Figure 3:
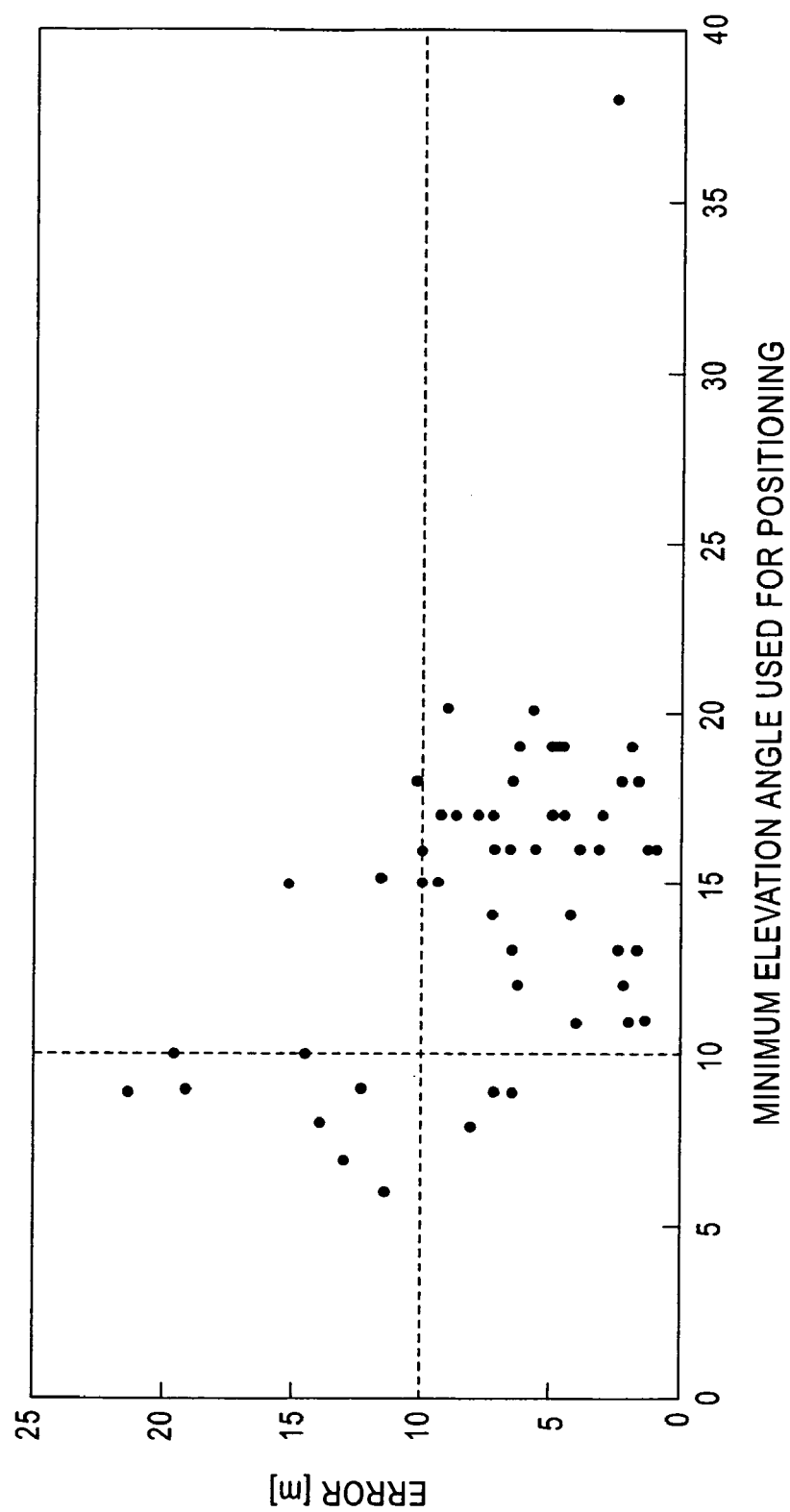
FIG. 3 shows the relationship between the minimum value in the elevation angles of a plurality of GPS satellites used for three-dimensional positioning and the positioning error.

FIG. 3 shows the relationship between the minimum value in the elevation angles of a plurality of GPS satellites used for three-dimensional positioning and the positioning error. FIG. 3 shows the actual measurement results concerning how the positioning error changes when the combination of GPS satellites is changed and thereby the minimum elevation angle (the minimum value in the elevation angles) is changed. As shown in FIG. 3, when the minimum elevation angle is larger than ten degrees, the positioning error is smaller than or equal to ten meters in almost all measurement samples. When the minimum elevation angle is smaller than or equal to ten degrees, the positioning error is smaller than or equal to 25 meters in all measurement samples.

Figure 4:
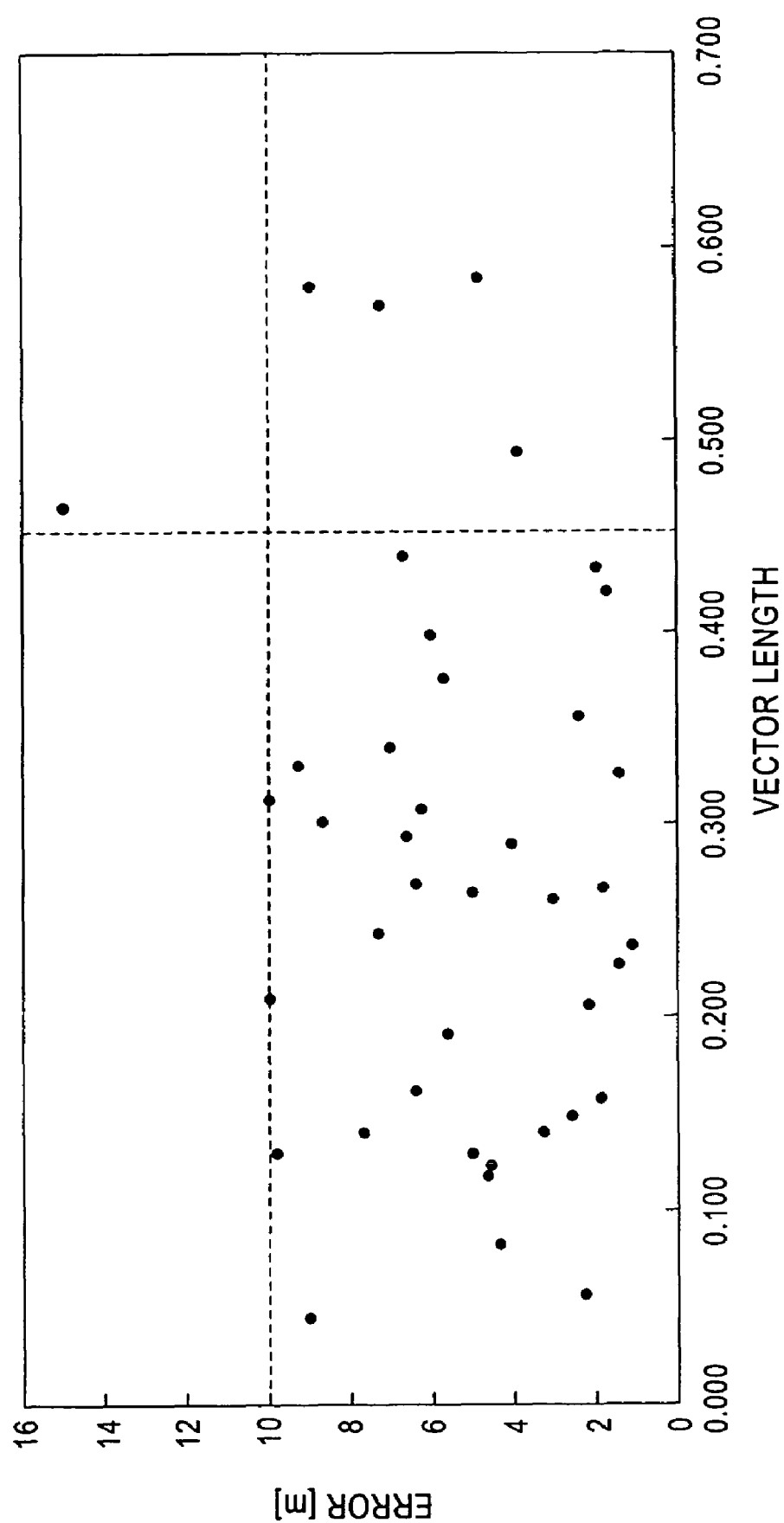
FIG. 4 shows the relationship between the length of the center-of-gravity vector of a plurality of GPS satellites used for three-dimensional positioning and the positioning error.

FIG. 4 shows the relationship between the length of the center-of-gravity vector (vector length) of a plurality of GPS satellites used for three-dimensional positioning and the positioning error. FIG. 4 shows the actual measurement results concerning how the positioning error changes when the combination of GPS satellites is changed and thereby the length of the center-of-gravity vector is changed. As shown in FIG. 4, when the vector length is smaller than or equal to 0.45, the positioning error is smaller than or equal to ten meters in almost all measurement samples. When the vector length is larger than 0.45, the positioning error is smaller than or equal to 15 meters in all measurement samples. The vector length is normalized and it is one when the end point of a center-of-gravity vector is on the circumference of the circle shown in FIG. 2.

Figure 5:
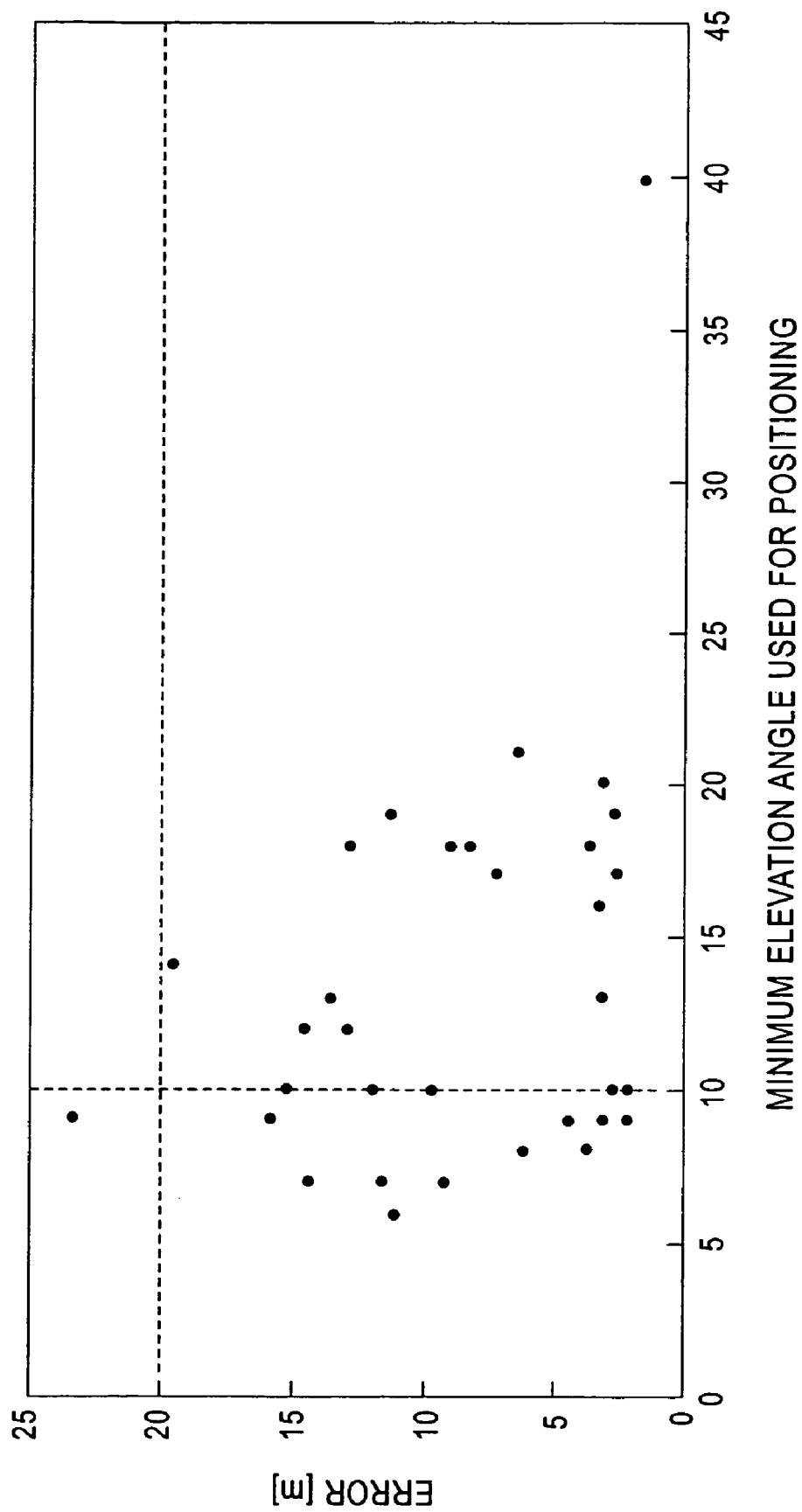
FIG. 5 shows the relationship between the minimum value in the elevation angles of a plurality of GPS satellites used for two-dimensional positioning and the positioning error.

FIG. 5 shows the relationship between the minimum value in the elevation angles of a plurality of GPS satellites used for two-dimensional positioning and the positioning error. FIG. 5 shows the actual measurement results concerning how the positioning error changes when the combination of GPS satellites is changed and thereby the minimum elevation angle (the minimum value in the elevation angles) is changed. As shown in FIG. 5, when the minimum elevation angle is larger than ten degrees, the positioning error is smaller than or equal to 20 meters in all measurement samples. When the minimum elevation angle is smaller than or equal to ten degrees, the positioning error is smaller than or equal to 25 meters in all measurement samples.

Figure 6:
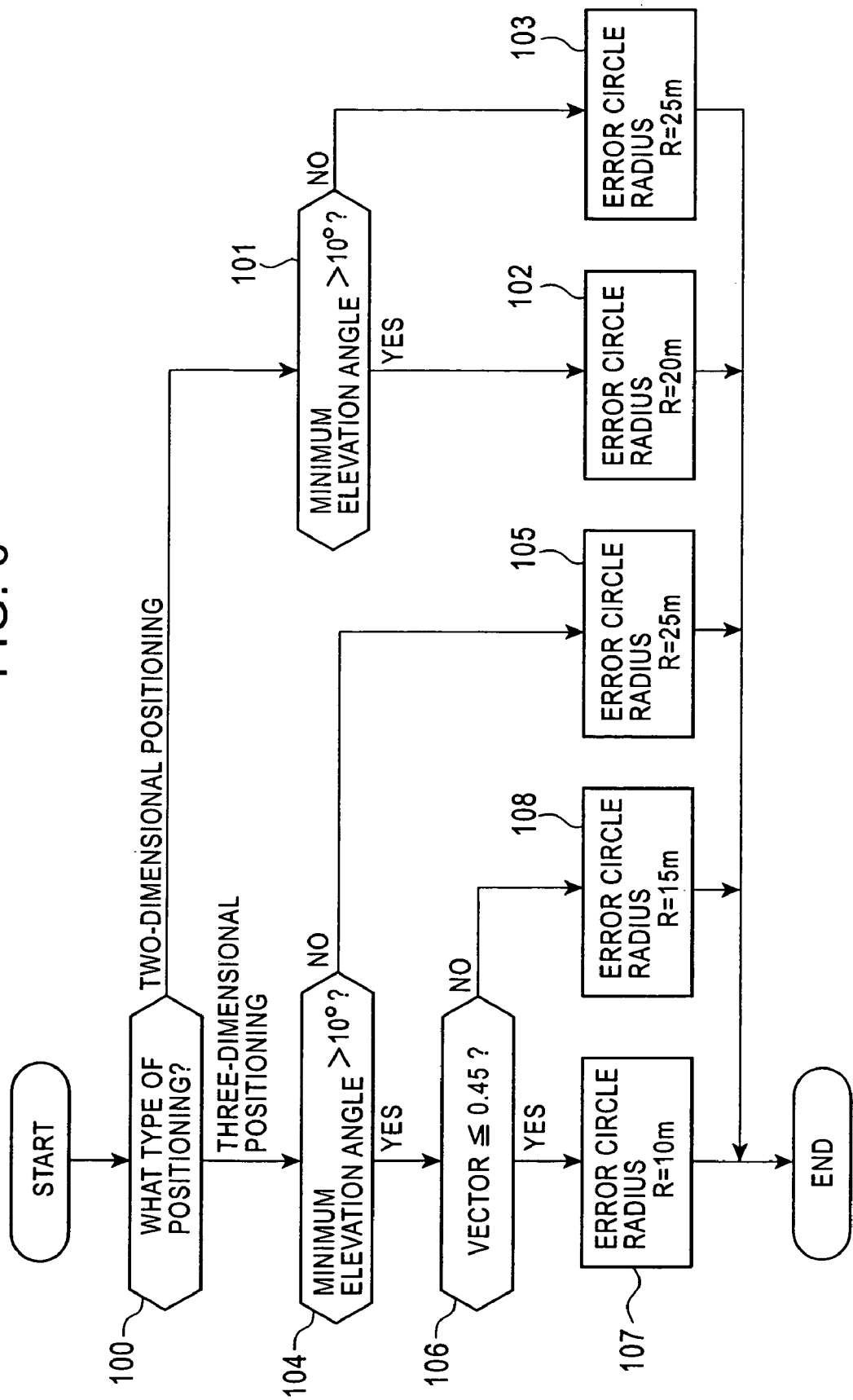
FIG. 6 is a flowchart showing the procedure for determining the error circle radius in the error-circle-radius calculating subunit.

FIG. 6 is a flowchart showing the procedure for determining the error circle radius in the error-circle-radius calculating subunit 14. The error-circle-radius calculating subunit 14 first determines the positioning type (step 100). In the case where the positioning type is a two-dimensional type, the error-circle-radius calculating subunit 14 determines whether the minimum elevation angle of the GPS satellites used for positioning is larger than ten degrees or not (step 101). When it is larger than ten degrees, an affirmative determination is made, and the error circle radius R is set to 20 meters (step 102). When it is smaller than or equal to ten degrees, a negative determination is made, and the error circle radius R is set to 25 meters (step 103).

In the case where the positioning type is a three-dimensional type, the error-circle-radius calculating subunit 14 determines whether the minimum elevation angle of the GPS satellites used for positioning is larger than ten degrees or not (step 104). When it is smaller than or equal to ten degrees, a negative determination is made, and the error circle radius R is set to 25 meters (step 105). When the minimum elevation angle is larger than ten degrees, an affirmative determination is made in step 104, and then the error-circle-radius calculating subunit 14 determines whether the length of the center-of-gravity vector is smaller than or equal to 0.45 (step 106). When it is smaller than or equal to 0.45, an affirmative determination is made, and the error circle radius R is set to ten meters (step 107). When the length of the center-of-gravity vector is larger than 0.45, a negative determination is made, and the error circle radius R is set to 15 meters (step 108).

As described above, the error circle radius (error range) of the GPS position is determined in consideration of the elevation angle of the GPS satellites used for positioning and the length of the center-of-gravity vector showing the spatial bias. Therefore, the accuracy in the determination of the error range can be improved. Since the error range can be determined appropriately, when other positioning means such as an autonomous navigation sensor 3 is used with the GPS receiver, the positioning accuracy of the other positioning means can be estimated accurately, and the accuracy of calculating the current position can be improved.

In addition, the length of the center-of-gravity vector, that is to say, the degree of bias of location of the GPS satellites with respect to the zenith is reflected in the error range. Therefore, the accuracy of determining the error range can be further improved. Particularly in the case where the GPS satellites are disposed evenly around the zenith, the error range can be reduced. Thus, the error range can be determined with accuracy according to the actual conditions.

In addition, the minimum value is found from among the elevation angles of a plurality of GPS satellites, and the location of the GPS satellite contributing most to the error is reflected in the error range. Therefore, the accuracy of determining the error range can be further improved. The error range is determined in inverse proportion to the minimum value in the elevation angles. That is to say, a small error-circle-radius is set when the minimum value in the elevation angles is large, and a large error-circle-radius is set when the minimum value in the elevation angles is small. Thus, the error range can be determined with accuracy according to the actual conditions.

The present invention is not limited to the above-described embodiments. Various changes may be made without departing from the spirit and scope of the present invention. For example, in the above-described embodiments, the minimum value in the elevation angles is used in combination with the length of the center-of-gravity vector to determine the error circle radius. However, since the minimum value in the elevation angles and the length of the center-of-gravity vector are each closely related to the error circle radius, either of them may be used alone and conditional branching may be used to determine the error circle radius.

The invention claimed is:

1. A navigation apparatus comprising:
   a GPS receiver that receives radio waves transmitted from a plurality of GPS satellites and produces a GPS position;
   an elevation-angle detecting unit that detects elevation angles of the plurality of GPS satellites used for calculating the GPS position;
   a center-of-gravity-position detecting unit that detects a center-of-gravity position of the plurality of GPS satellites used for calculating the GPS position;
   an error-range determining unit that determines an error range around the GPS position using the elevation angles detected by the elevation-angle detecting unit and the center-of-gravity position detected by the center-of-gravity-position detecting unit; and
   a current-position calculating unit that calculates a current position using the GPS position produced by the GPS receiver and the error range determined by the error-range determining unit.

2. The navigation apparatus according to claim 1, further comprising a positioning unit that performs positioning without using the GPS receiver and provides a second position, wherein the current-position calculating unit uses the second position when the second position is within the error range, and uses the GPS position when the second position is out of the error range, to calculate the current position.

3. The navigation apparatus according to claim 2, wherein the positioning unit is an autonomous navigation sensor including a direction sensor and a velocity sensor.

4. The navigation apparatus according to claim 1 wherein the error-range determining unit determines the error range using a degree of deviation from the zenith of the center-of-gravity position detected by the center-of-gravity-position detecting unit.

5. The navigation apparatus according to claim 4, wherein the error-range determining unit determines the error range in proportion to the degree of deviation.

6. The navigation apparatus according to claim 1, wherein the error-range determining unit finds a minimum value out of the elevation angles of the plurality of GPS satellites and determines the error range using the minimum value.

7. The navigation apparatus according to claim 6, wherein the error-range determining unit determines the error range in inverse proportion to the minimum value.

8. A method of operation in a navigation apparatus comprising;
   using a GPS receiver, receiving radio waves transmitted from a plurality of GPS satellites and calculating a GPS position;
   detecting elevation angles of the plurality of GPS satellites used for calculating the GPS position;
   detecting a center-of-gravity position of the plurality of GPS satellites used for calculating the GPS position;
   determining an error range around the GPS position using the detected elevation angles and the detected center-of-gravity position; and
   calculating a current position using the GPS position calculated by the GPS receiver and determined error range.

9. The method according to claim 8, further comprising performing positioning without using the GPS receiver to provide a second position, and calculating the current position using the second position when the second position is within the error range, or using the GPS position when the second position is out of the error range.

10. The method according to claim 9, wherein an autonomous navigation sensor including a direction sensor and a velocity sensor is used to perform positioning without using the GPS receiver.

11. The method according to claim 8, wherein the act of determining the error range uses a degree of deviation from the zenith of the detected center-of-gravity position.

12. The method according to claim 11, wherein the determined error range is in proportion to the degree of deviation.

13. The method according to claim 8, wherein the act of determining the error range finds a minimum value out of the elevation angles of the plurality of GPS satellites and determines the error range using the minimum value.

14. The method according to claim 13, wherein the act of determining the error range determines the error range in inverse proportion to the minimum value.

* * * * *